(12) United States Patent
Arnold

(10) Patent No.: US 7,026,760 B2
(45) Date of Patent: Apr. 11, 2006

(54) SOURCE OF LIGHT AND METHOD FOR REGENERATING A SOURCE OF LIGHT

(75) Inventor: Jörg Arnold, Bern (CH)

(73) Assignee: IP2H AG, Bern (CH)

( * ) Notice: Subject to any disclaimer, the term of this patent is extended or adjusted under 35 U.S.C. 154(b) by 0 days.

(21) Appl. No.: 10/933,942

(22) Filed: Sep. 3, 2004

(65) Prior Publication Data
US 2005/0023985 A1 Feb. 3, 2005

Related U.S. Application Data

(63) Continuation of application No. PCT/DE03/00474, filed on Feb. 17, 2003.

(30) Foreign Application Priority Data

Mar. 4, 2002 (DE) ............................... 102 09 242
Aug. 29, 2002 (DE) ............................... 102 40 560

(51) Int. Cl.
*H01J 9/50* (2006.01)
*H01J 61/02* (2006.01)

(52) U.S. Cl. ..................... 313/551; 313/550; 313/563; 313/564; 313/578; 313/547

(58) Field of Classification Search ................ 313/345, 313/355, 546–551, 556, 557, 561–564, 566, 313/578, 311, 15, 631–633, 491
See application file for complete search history.

(56) References Cited

U.S. PATENT DOCUMENTS

| 2,072,788 | A | * | 3/1937 | Andrews | ..................... 313/578 |
| 4,539,505 | A | * | 9/1985 | Riseberg | ..................... 313/315 |
| 4,965,490 | A | * | 10/1990 | Ratner | ......................... 313/569 |
| 5,841,222 | A | * | 11/1998 | Heuvelmans et al. | ....... 313/345 |
| 6,777,859 | B1 | * | 8/2004 | Arnold | ........................ 313/315 |

FOREIGN PATENT DOCUMENTS

| DE | 644 087 | 4/1937 |
| GB | 8283 | 8/1909 |

* cited by examiner

*Primary Examiner*—Ashok Patel
(74) *Attorney, Agent, or Firm*—Alston & Bird LLP

(57) ABSTRACT

A light source with a heatable filament (1) or an electrode, with the filament or the electrode being arranged in a bulb (2) or in a tube, is provided with an improved service life by the provision of a depot (3) with at least one chemical element that is also present in the filament or the electrode, and which is associated with the filament or the electrode such that the element is supplied to the filament or the electrode. Furthermore, a method is described for regenerating a light source with a heatable filament (1) or an electrode, with the filament or the electrode being arranged in a bulb (2) or in a tube. By the method, the depot (3) is associated in a first step to the filament or the electrode, with the depot comprising at least one chemical element that is also present in the filament or the electrode. Finally, the element is supplied to the filament or the electrode.

53 Claims, 3 Drawing Sheets

SOURCE OF LIGHT AND METHOD FOR REGENERATING A SOURCE OF LIGHT

CROSS REFERENCE TO RELATED APPLICATION

The present application is a continuation of international application PCT/DE03/00474, filed 17 Feb., 2003, and which designates the U.S. The disclosure of the referenced application is incorporated herein by reference.

BACKGROUND OF THE INVENTION

The invention relates to a light source and a method for regenerating a light source with a heatable filament or an electrode, with the filament or the electrode being arranged in a bulb or in a tube.

Light sources of the type under discussion have been known from practice for a long time, and they exist in a great variety of designs and sizes. They are known in particular as electric incandescent lamps, electric halogen lamps, and electric discharge lamps in low-pressure or high-pressure designs, as well as electronic light-emitting diodes. The light sources are based on thermionic emission, collision excitation of gases, or a luminescence effect, for example, in luminescent tubes.

Disadvantageous in all these known light sources is that the filaments or electrodes which glow during their operation change to their disadvantage as operating time increases. The change can be chemical, such as, for example, a conversion or a poisoning because of a chemical reaction with chemical constituents of the atmosphere surrounding the filament or electrode. On the other hand, the change can be physical because of heat and temperature influences on the filament or the electrode, for example, an evaporation of the filament or electrode material, or a melting, or crystallization effects with subsequent rupture symptoms. All these changes are symptoms of aging, and they increasingly impair or even stop the operability or light generation of the known light sources or lamp types.

It is therefore an object of the present invention to provide both a light source of the initially described type and a method, which permit extending the service life of the light source with constructionally simple means.

SUMMARY OF THE INVENTION

In accordance with the invention, the foregoing and other objects and advantages are achieved by the provision of a light source which comprises a heatable filament or electrode arranged in a bulb or tube, and which further comprises a depot which is arranged in association with the filament or electrode. The depot includes at least one element which is also present in the filament or electrode. With that, the element can be supplied to the filament or the electrode.

As used herein, the term "depot" refers to a receptacle or body in which a substance can be accumulated, deposited, or stored and from which it can be distributed.

It has been found by the invention that it is possible to regenerate to a certain extent a filament or an electrode, which has undergone a change caused by the time of service or by age. To this end, the filament or the electrode receives a chemical element, which is for example evaporated from the filament or electrode during the operating or aging process. With that, it is possible to at least suppress the process of change of the filament or electrode and to even reverse it to a certain extent. In so doing, it becomes possible to quasi restore the material of the filament or electrode that has been changed because of service or age. To realize the process, a depot with at least one chemical element is associated to the filament or the electrode. This chemical element is also present in the filament or the electrode. More specifically, during the operation of the light source, the filament or the electrode receives the at least one chemical element from the separate depot, so that it is possible to at least suppress the changes of the filament or the electrode as a result of service or age, and to even reverse them again to a great extent. As a result, the filament or electrode is quasi "recharged". While in essence this process does not constitute the return of material that was an original constituent of the filament or electrode, it does provide additional material from the depot.

The light source of the invention permits realizing an obvious extension of the service life of a light source. The service life lasts at least until the time, when the chemical element made available in the depot is quasi used up. Consequently, the light source of the invention realizes a light source, whose service life is extended with constructionally simple means.

Specifically, the extension of the service life of the light source occurs during the normal operating state of the light source. During this operating state, it is possible to quasi regenerate the filament or the electrode of the light source. To this end, it will not be necessary to shut down the operation of the light source.

Also, the element could be supplied onto or into the filament or the electrode. With that, it becomes possible to realize a particularly reliable regeneration of the filament or electrode, since a direct contact between the element and the material of the filament or the electrode could be used to assist in reactions that are favorable for the regeneration.

In a particularly reliable manner, the element could be supplied by means of a gas or a vapor that contains the element. The gas or the vapor could then fulfill a transportation function for the element.

An acceleration in the supply of the element to the filament or electrode could occur by a supply under the influence of heat, which would permit accelerating the steps of transportation.

Depending on the composition of the filament or the electrode individual temperatures of the filament or the electrode are favorable for the regeneration process. It has been found in practice that, for example, in the case of a tantalum carbide filament, it is especially favorable to supply the element at a temperature of the filament of about 2000 degrees Celsius.

The element could be kept in the depot in a solid or liquid form, or in a gaseous or vaporous state. In this connection, adjustments need to be made to the particular case of application. Furthermore, the element could be stored in the depot in a chemically combined or uncombined form with or without a carrier. Likewise, in this instance, the selection of the way of supplying the element could be adapted to the particular case of application.

In particular with the use of a tantalum carbide filament, it will be advantageous, when the depot includes an organic substance that contains the element. This has resulted in practice in especially effective supply processes.

With respect to supplying the chemical element in a reliable manner, the depot could include a carrier for the element. Such a carrier could be immersed before its use, for example, into a liquid organic substance that contains the element. In the alternative, the carrier could be immersed before its use into an organic solvent that contains the element, for example, into acetone, formaldehyde, or acetic acid. In so doing, a predeterminable quantity of the substance, into which the carrier is immersed, normally adheres to the carrier. This quantity will then serve as the depot that contains the chemical element.

Specifically, the carrier could be made of rubber or polymers. In this connection, the configuration of a rubber O-ring or polymer O-ring has been found especially practical, since such a rubber or polymer O-ring is easy to insert into a bulb or a tube.

In a further advantageous manner, the carrier could be made porous, so that it has quasi interior surfaces, which permit arranging an especially large quantity of liquid substance on or in the carrier. In a concrete realization, the carrier could be made of a ceramic, of polymers, polymer plastic, of foam metal, or a sintered material.

With respect to supplying the element to the filament or the electrode in an especially reliable manner, it would be possible to arrange the depot in the bulb or tube. In this case, it is especially advantageous to arrange the depot in the base of the bulb, since in this location the light radiation by the light source is in most cases not shielded or impeded.

With respect to providing the chemical element in a reliable manner for supplying it to the filament or electrode, the light source could include a heating device for the depot and thus for the element. In particular when the chemical element is present in a solid or liquid form, a separate heating device for the depot will be advantageous, for example, for evaporating or gasifying the element.

Depending on the case of application, the heating device could satisfactorily operate by induction. With respect to an especially simple realization of the heating device, the heating device could be an electric resistance heater.

To avoid an additional installation of a separate heating device, the heating device could be realized by components of the light source that are connected to the depot in a heat-conductive manner. In this connection, it would be possible to use for heating the depot quasi waste heat from already existing components of the light source.

The control of the temperature of the depot and thus of the element could occur by the spatial distance of the depot from the filament or the electrode. In particular, when heating the depot by radiation heat of the filament or the electrode, one could arrange the depot closer to the filament or the electrode, when a higher temperature is desired. Accordingly, one could arrange the depot at a greater distance from the filament or the electrode, when a lower temperature is desired. When arranging the depot in the neck of a bulb, it would be possible to control the temperature of the depot and, thus, of the element in a concrete manner by the neck length of the bulb in combination with the arrangement of the depot in the neck of the bulb. Accordingly, when arranging the filament or the electrode in a tube, it would be possible to control the temperature of the depot by the length of the tube in combination with the arrangement of the depot in the tube.

In an alternative realization of the light source it would be possible to arrange the depot in the filament or the electrode. In this case, the depot is quasi an internal depot, which provides the chemical element in the filament or electrode. The depot could then be made integral with the filament or the electrode.

In a specific realization, the depot could contain carbon or be made of carbon. In a particularly simple realization, the depot is a carbon compact with the filament or electrode being arranged on the carbon compact. In this arrangement, the chemical element, for example, carbon could be supplied during the operation of the light source, when the filament or the electrode is heated for generating light.

The supply could then occur via a diffusion process from an inner region of the filament or electrode to an outer region of the filament or electrode.

In a further specific realization, the light source could include at least two filaments or electrodes that are operable or heatable independently of each other. The filaments or electrodes could then be arranged in the same bulb or in the same tube.

During the operation of this type of light source, it would be possible to supply the chemical element that evaporates from a filament operating at a high operating temperature to a filament operating at a lower temperature for regenerating it during or after the operation of the light source. Once the service life of the filament operating at a high operating temperature has run out, it will be possible to switch the light-generating operation at the high temperature to a filament that has until then been regenerated. It will then be possible to regenerate the depleted filament again in the same manner at, for example, a lower process temperature. Such a reciprocal regeneration of two or more filaments permits extending the service life of a light source to a great extent.

In the case of a reciprocal regeneration of filaments or electrodes, a heat conductive contact could exist between the filaments or electrodes. This would make it possible to supply waste heat that is produced by one filament during the light generation, in an energetically favorable manner to the other filament. Such a waste heat could suffice for realizing a heating of the filament or electrode, which is adequate for regenerating the currently inoperative filament.

The filament or electrode could be heatable, preferably cyclically, to different temperatures. To this end, the light source could include a heating device for the filament or filaments or for the electrode or electrodes. In this case, a separate heating device could be associated to each filament or each electrode. Concretely, the heating device could be designed for generating an electric ac voltage or a pulsed or timed electric voltage for heating the filament or filaments or the electrode or electrodes. As an alternative thereto, the filament or filaments or the electrode or electrodes could be heated by means of an inductively operating heating device. The foregoing realizations are to be adapted to the respective case of application and to the respective, particularly favorable regeneration cycles.

In a further specific realization, a gaseous atmosphere in the bulb or tube could contain an at least binary gas mixture with a lighter and a heavier gas or vapor. Such a gas mixture is favorable in particular in a close arrangement of a hotter filament and, relative thereto, a cooler filament. In this case, it is possible to generate in the surrounding, for example, carbon containing gas or vapor a high temperature gradient between the two filaments and, as a result, an efficient transportation of carbon by thermal diffusion contrary to a transportation by diffusion or convection. To this end, it is necessary to have in the process gas atmosphere around the filaments, an at least binary gas mixture of a substantially lighter gas or vapor, for example, hydrogen or helium, than the free, gaseous carbon or the existing carbon compounds. The heavier components of the process gas, such as the carbon or carbon compounds, will then concentrate in the cooler region, whereas the lighter constituents of the process gas concentrate in the hotter region.

A transportation by thermal diffusion to a filament or electrode, which is to be regenerated, may furthermore be promoted by surrounding the filaments or electrodes with two bulbs or tubes. More specifically, a second bulb or a second tube will surround the bulb or tube that accommodates the filaments. In this case, the second bulb or tube will form a seal against the external atmosphere or surroundings.

The space between the first and the second bulb or between the first and the second tube could contain a vacuum or a very thin gas atmosphere with little heat conduction. During the operation, the surface of the inner bulb heats to a greater extent than the outer bulb, since the latter is or can be convection cooled or forced cooled in the external air atmosphere. With that, it is possible to reduce the temperature gradient and the resultant element transportation by means of thermal diffusion from the filaments or electrodes to the inner bulb surface. Conversely, it is possible to improve the element transportation by means of thermal diffusion from the heated filament or the heated electrode to the relatively cooler filament or the relatively cooler electrode. The foregoing remarks will analogously apply to a realization with a first and a second tube.

With respect to a particularly compact realization of a light source, the filaments could be arranged in mutually looping relationship. Concretely, the light source or light bulb could comprise two mutually looping, spiraled filaments, which are each electrically contacted at their one ends on different connectors and at their other ends on a common connector. In this realization, the light source may comprise a total of three electrical contacts or connectors. An electrical contact with respectively two separate connectors per filament is likewise possible. In principle, these designs may also be provided with more than two filaments.

The constructional realization with two tubes or bulbs also permits reducing a disturbing deposit of the chemical element, for example carbon, on the heated inner surface of the first bulb or the first tube. This can be further assisted in that the inner bulb or the inner tube has a volume that is as small as possible and, with that, a temperature distribution that is as homogeneous as possible for purposes of reducing as much as possible an overriding transportation of the element or the element compounds by convection. Lastly, the second bulb or the second tube will serve as a protective enclosure, if, for example, the inner bulb or the inner tube explodes because of pressure or temperature influences.

In an especially practice-proven construction of the light source, the filament or electrode could contain tantalum carbide. The element could be carbon.

In addition to the foregoing realizations of a light source according to the invention, the above-described object is also accomplished by a method for regenerating a light source. Accordingly, a method is provided for regenerating a light source with a heatable filament or electrode, with the filament or electrode being arranged in a bulb or tube. According to the method, a depot is associated in an initial step to the filament or electrode, with the depot comprising at least one chemical element that is also present or contained in the filament or electrode. In a subsequent step, the element is supplied to the filament or electrode.

In a specific realization, the element could be supplied onto or into the filament or electrode.

With respect to a reliable supply, one could provide the element by means of a gas or vapor, which contains the element. The element could be supplied to the filament or electrode under the influence of heat. One could supply the element to the filament or electrode at a temperature of about 2000 degrees Celsius. The transportation could occur by means of diffusion, thermal diffusion, or convection.

Before its use, a carrier for the element that is associated to the depot could be immersed into a liquid organic substance that contains the element, or into an organic solvent that contains the element, for example, into acetone, formaldehyde, or acetic acid. This makes it possible to arrange a desired substance on the carrier in a simple manner.

The temperature of the depot and, thus, of the element could be controlled by the spatial distance of the depot from the filament or electrode. In the alternative, one could control the temperature of the depot and, with that, of the element by the neck length of the bulb or the length of the tube in combination with the arrangement of the depot in the neck of the bulb or in the tube. In so doing, it is assumed that the filament or electrode is operated at a high temperature. The temperature of the depot and, with that, of the element will then decrease in most cases as the distance from the filament or electrode increases.

The filament or electrode could be heated to different temperatures, preferably cyclically, for reaching the most favorable operating temperature for regenerating the filament or electrode.

A filament or electrode could heat another filament or electrode via heat radiation and/or by way of a heat conductive contact. This would permit utilizing in an energetically favorable manner the waste heat of the filament or electrode that is heated for generating light.

Depending on the case of application, one could heat the filament or electrode with an electrical ac voltage or a pulsed or timed electrical voltage by the principle of a resistance heating. As an alternative, the heating of the filament or filaments or of the electrode or electrodes could occur by means of an inductively operating heating device.

In a particularly simple regeneration process, one could operate two or more filaments or electrodes for alternately generating light, and supply the element simultaneously to at least one filament or electrode that operates without generating light.

As regards further advantageous effects of the foregoing realizations of the method according to the invention for regenerating a light source, the corresponding descriptions in parallel claims relating to a light source are herewith incorporated by reference for purposes of avoiding repetitions.

In an especially favorable manner, the method for regenerating a light source can be applied to the light sources as described herein.

For an added understanding of the present invention, essential aspects of the invention are described in greater detail one more time in the following:

When regenerating a light source, it is possible to apply the same chemical or physical processes, which in turn lead to an aging of the electrodes or filaments. This is described by means of a representative example, wherein a light bulb is operated by light generating filaments. However, the invention can likewise be applied to filaments or electrodes in other electrically operated light sources.

The present invention is contrary to the known tungsten-halogen cycle in a conventional halogen lamp with a tungsten filament. In the known halogen lamp, tungsten that evaporates from the hot filament surface is again returned to the hot filament surface by means of the chemical tungsten-halogen cycle during the operation of the lamp. However, this does not constitute a regeneration of the filament, since the tungsten that originates and evaporates from the filament is only returned to the surface region of the filament to increase there the concentration of tungsten vapor. This reduces the effective evaporation rate and evaporation speed of the tungsten from the filament. During the operation of the lamp, this chemical cycle is a closed-loop chemical process, which receives for regeneration no additional chemical constituents from a separate depot. The evaporation rate and evaporation speed remain positive at any rate and at any time, and no additional chemicals as are needed for regeneration are added to the chemical process of the lamp operation.

In a cyclical operation of a lamp, the described invention enables an effective negative evaporation rate, namely a kind of "recharging" the filament or electrode within an operating cycle. In a continuous operation of the lamp, the invention permits reducing an aging of the filament to a significant extent by adding and using additional chemical substances from a depot.

With the use of tantalum carbide or tantalum carbon as material for the filament, one is able to find that at high operating temperatures of far above 2000 degrees Celsius, for example, at typically 3600 degrees Celsius, tantalum carbide loses its carbon constituent by the evaporation of carbon from the filament surface. This causes the very temperature resistant appearance phase of the tantalum carbide filament, which is produced by suitable preparation, to be converted into a less temperature resistant phase, which will then lead after a certain period of time and at the applied operating temperatures to a destruction of the filament by melting or breaking.

The preparation and also a regeneration of the initial phase of the tantalum carbide filament which is resistant to high temperatures can however occur at lower operating temperatures of typically about 2000 degrees Celsius, with carbon being supplied to the filament surface from, for example, carbon containing gases or vapors. The tantalum or the tantalum carbide phase in the present case absorbs again carbon at about 2000 degrees Celsius under a suitable condition of the gas atmosphere, and forms again the initial tantalum carbide phase which is resistant to high temperatures. The carbon containing gases or vapors may originate from a depot, which releases them in addition. Besides the carbon containing gases or vapors, it is possible to supply from a depot also other suitable chemicals for the regeneration.

The reciprocal regeneration of two or more filaments has already been described in greater detail above. A one sided regeneration of only one lamp filament or a single filament lamp requires that if need arises, the filament be brought either cyclically to different operating temperatures, or that the process of the regeneration or the supply of the regeneration chemicals simultaneously override the process of degradation at a constant operating temperature. The different temperature cycles can be produced, for example, by applying electrical ac operating voltage or a pulsed or timed electrical operating voltage. The supply of carbon containing gases or vapors or other chemicals that are needed for the regeneration can occur in a simple manner by diffusion, thermal diffusion, or convection.

In an exemplary constructional realization, it is possible to arrange in the place of one filament of an exemplary incandescent lamp two or more filaments in very close relationship. Flat filaments may be arranged with surface normals extending parallel to one another, and linear filaments may be arranged in coaxial or parallel relationship.

There is no limitation with respect to realizing flat filaments in a level, planar, or folded form, or with respect to providing linear filaments in an elongated, folded, or spiraled form. Furthermore, mixed forms are possible, in which, for example, a linear filament is surrounded or enclosed by a flat filament. Flat filaments also include perforated or lattice-type filaments. Furthermore, the filaments may be electrically contacted separately and independently of one another or jointly or in dependence on one another. The same applies to heating coils or electrodes of other light sources, which can be regenerated in a similar chemical or physical process.

This close arrangement of the filaments meets with the object of heating another adjacent filament to the process temperature that is required for the regeneration by the radiation heat of an electrically operated filament. However, the required process temperature can also be generated by a direct electrical heating of the filament being regenerated, or by a heat conductive contact of the filament with the operative heated filament, or by an inductive electromagnetic heating.

The single filament construction has the disadvantage that in the presence of gas mixtures with light gas constituents, such as hydrogen or helium, the thermal diffusion leads to an exclusive removal and to a sole deposit of the heavier process gas constituents, such as carbon or carbon compounds, from the heated filament region to the cooler region of the bulb wall. For regenerating single filament lamps, it is possible to use only the normal diffusion or convection of the process gas constituents, which is however impeded by the overriding thermal diffusion.

The depot of the chemicals needed for the regeneration can be located inside the filament or electrode, or outside the filament or electrode. An example for an internal depot is, for example, in the case of the tantalum carbide filament, a carbon compact, which is coated with the tantalum carbide and thus forms a tantalum carbide filament. During the normal operation of the light source, the carbon evaporates from the outer tantalum carbide surface. However, it is again absorbed by the tantalum carbide via the inner tantalum carbide surface of the carbon compact, and with that the detrimental carbon loss of the tantalum carbide is again compensated. In this case, the regeneration process in a single filament lamp can occur at the normal, light generating operating temperature of the lamp filament.

In an external depot, the chemicals necessary for the regeneration could be present in a solid, or liquid, or gaseous form with or without carrier outside the filament that is to be regenerated. The external depot gradually releases the chemicals that are used for the regeneration, for example, continuously into the atmosphere around the filament that is to be regenerated. A constructional example of an external depot exists in the described multifilament lamp with tantalum carbide filaments. The filament that is just now in a light generating operation in a heated state evaporates carbon as, for example, a regeneration chemical, which is supplied, for example, by diffusion to the cooler filament that is just now being regenerated. In this case, the heated, light generating filament is an external depot for the cooler filament being regenerated.

In the case of the tantalum carbide lamp, the chemicals can be, for example, organic compounds, such as, for example, fats/oils, alcohols, esters, aldehydes, ketones, organic acids, etc., or pure carbon, or inorganic carbon compounds, such as carbon monoxide, carbon dioxide, etc., which are able to react or to dissociate in the lamp atmosphere to further, if need be, more complex or less complex chemical compounds. The required evaporation heat or, if need arises, a required dissociation energy is supplied to the chemicals, in that the chemicals, or their carriers, or their depot are thermally coupled by radiation heat or heat conduction directly or indirectly with a heat reservoir, for example, the heated filament, or that they are directly heated electrically or electromagnetically.

The above described examples of an internal and an external depot constitute at the same time examples for an electrically directly heated depot. In terms of construction, a heat-conductive coupling can occur, for example, via electrical metal lines, filament or electrode connectors, or the bulb wall, or the wall of bulb base, which may mount the depot. Constructively, the supply rate of the chemicals is defined by the degree of thermal coupling, or the coefficients of heat conduction, and the geometry of heat conduction of the special lamp, or by the geometry of radiation of the filaments, or the intensity of the electric heating current, or the coupled electromagnetic energy.

As regards the foregoing examples of a light source with a bulb, it should be expressly remarked that the characteristics described with reference thereto can also apply to light sources with a tube in the place of the bulb, and to light sources with an electrode in the place of the filament, and vice versa.

There exist various possibilities of improving and further developing the teaching of the present invention in an advantageous manner. To this end, one may refer to the following detailed descriptions of three preferred embodiments of the invention with reference to the drawing. In conjunction with the description of the preferred embodiments of the invention with reference to the drawing, also generally preferred improvements and further developments of the teaching are explained.

DETAILED DESCRIPTION OF THE PREFERRED EMBODIMENTS

Figure 1:
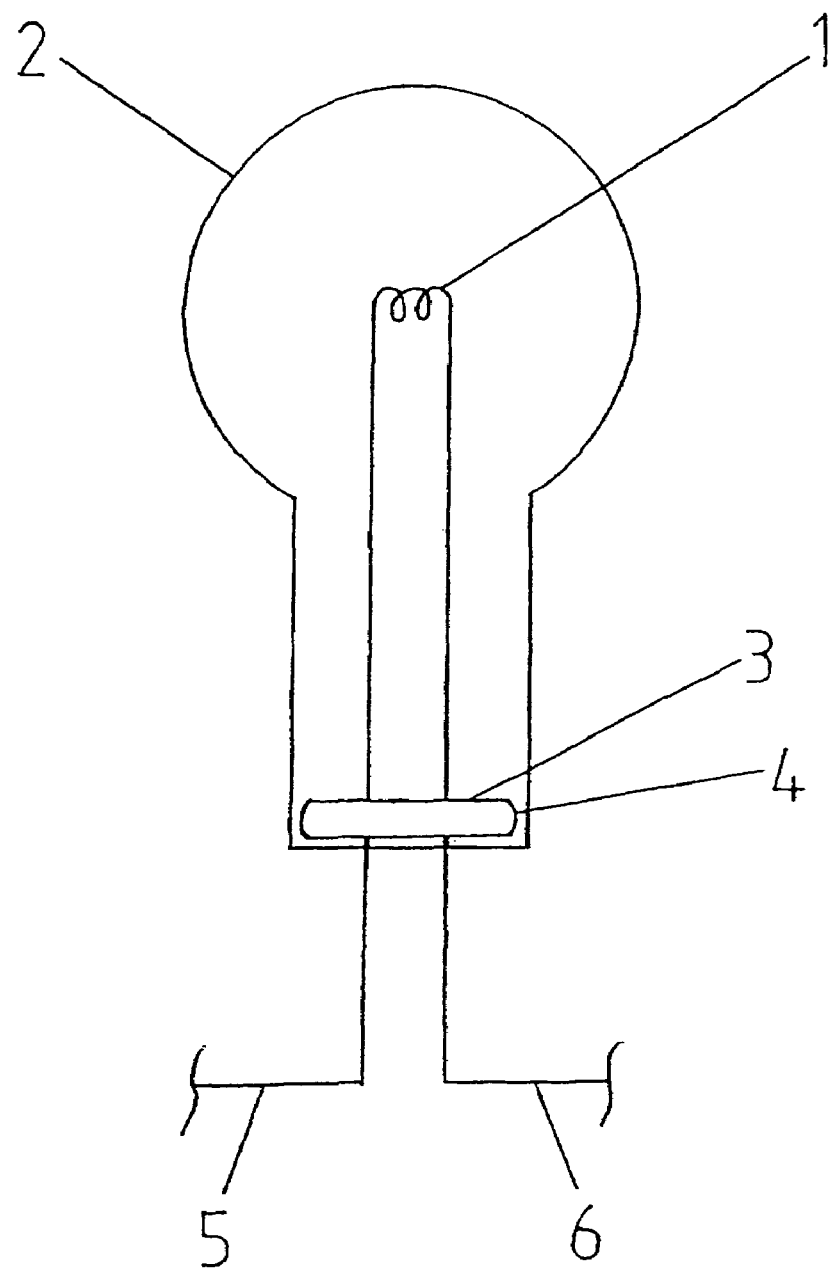
FIG. 1 is a schematic side view of a first embodiment of a light source according to the invention.

FIG. 1 illustrates a schematic side view of a first embodiment of a light source according to the invention. The light source comprises a heatable filament 1, with the filament 1 being arranged in a bulb 2. With respect to extending the service life of the light source, a depot 3 with at least one chemical element is associated to the filament 1, with the element being also present or contained in the filament 1. The element can be supplied to the filament 1 from the depot 3.

More specifically, the element is supplied directly onto the surface of the filament 1 or even into the filament 1. The depot 3 includes a carrier 4 for the chemical element, which is realized as an O-ring of rubber. Before its use, the carrier 4 is immersed into a liquid organic substance that contains the element, and subsequently it is arranged in the base of bulb 2.

During the operation of the light source and, thus, during the heating of the filament 1 via electrical contacts 5 and 6, the filament 1 radiates heat toward the depot 3. This causes the element 4 in the depot 3 to move by means of diffusion or thermal diffusion toward the filament 1. In this manner, the filament 1 receives again material, which the filament 1 has lost, for example, by evaporation during the operation of the light source. The material that is supplied to the filament 1 is no original filament material, but additional material that has been put into the bulb 2 by the depot 3. This embodiment of the light source requires no separate heating device for the depot 3.

Figure 2:
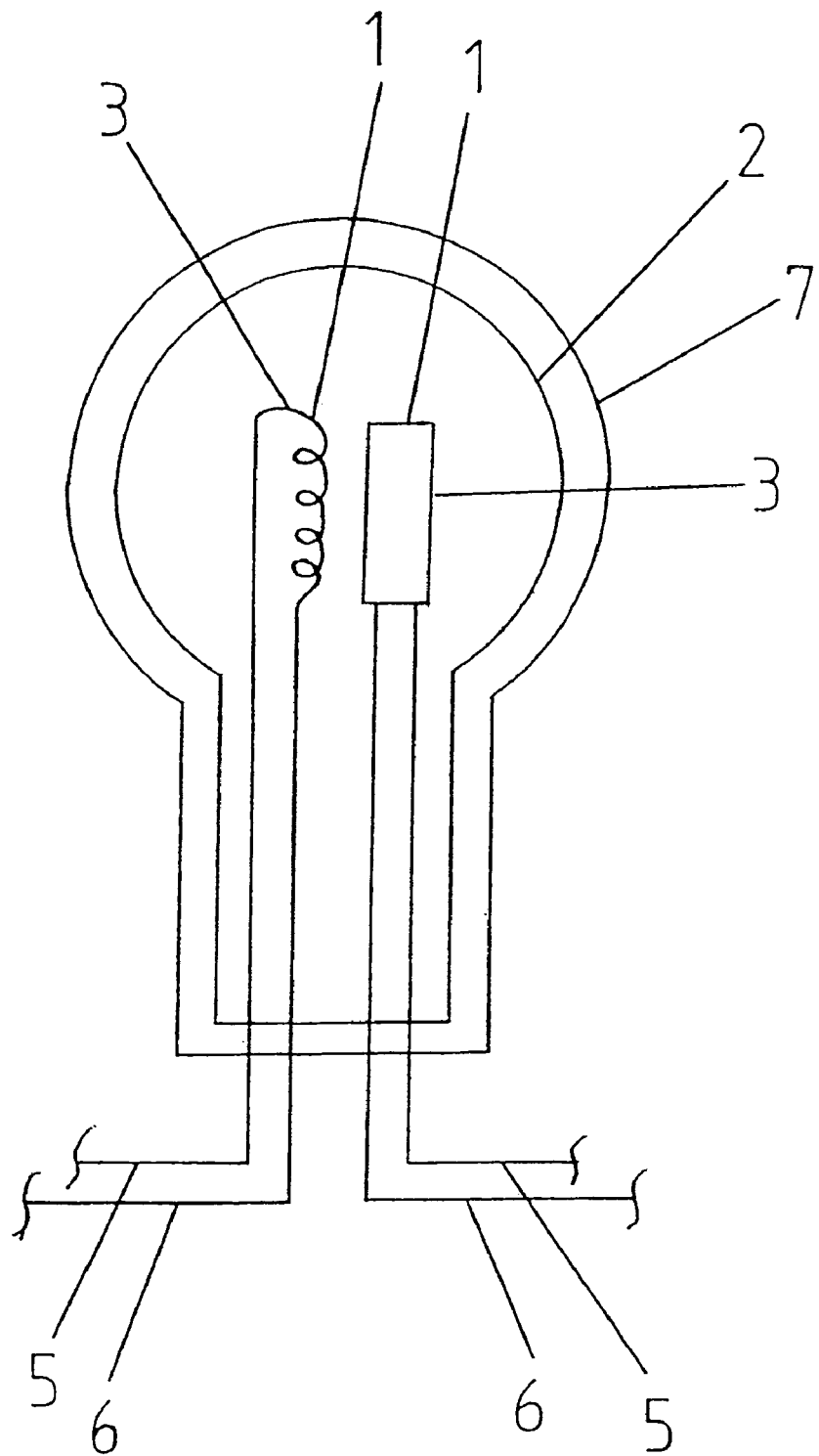
FIG. 2 is a schematic side view of a second embodiment of a light source according to the invention.

FIG. 2 illustrates a schematic side view of a further embodiment of a light source according to the invention. The light source comprises two filaments 1, which are arranged in a common bulb 2. The filaments 1 are tantalum carbide filaments, which are maintained at a high temperature during their operation and evaporate carbon in this process. This leads to an aging of the tantalum carbide filaments 1.

The light source can be operated such that the filaments 1 alternate in their light-generating operation. This has the advantage that the carbon evaporating from the one filament 1 being just now in operation can be supplied to the right now inoperative filament 1 for regenerating and forming again tantalum carbide. Thus, the filaments 1 alternately form a depot 3 for the respectively other filament 1.

The light source shown in FIG. 2 comprises a second bulb 7, which fully accommodates the first bulb 2. This has the advantage that the transportation of evaporated filament material to the inner surface of the bulb is reduced, since this embodiment permits maintaining the inner bulb 2 at a higher temperature than in an embodiment, in which the bulb 2 is the only bulb and in direct contact with cooler surroundings. In this case, there is a lesser temperature gradient between the filaments 1 and the inner surface of the bulb 2 that surrounds the filaments 1 than would be in an embodiment with only one bulb. The space between the bulbs 2 and 7 forms a thermal insulation against the surroundings. In the embodiment with two bulbs 2 and 7, it is possible to reduce the deposit of filament material on the inner side of a bulb.

Figure 3:
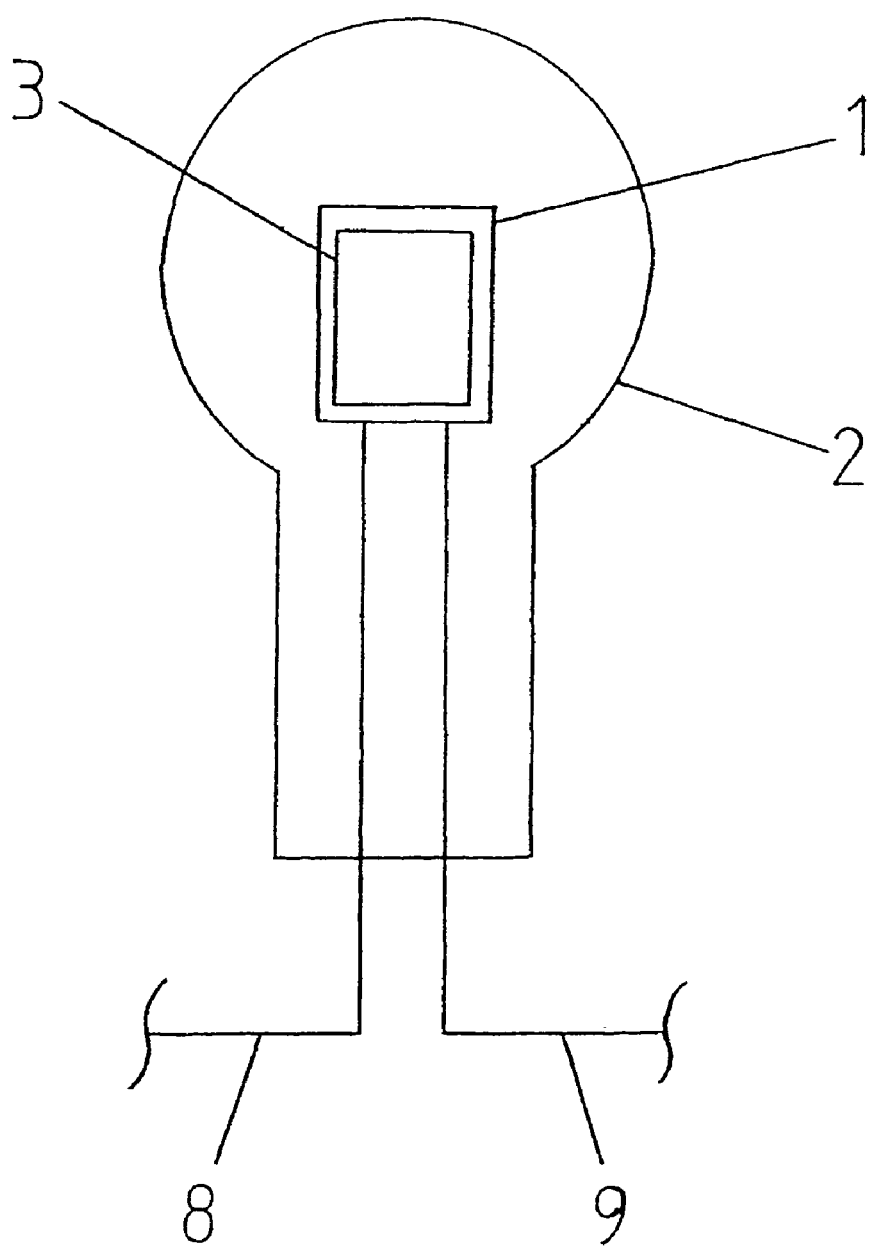
FIG. 3 is a schematic side view of a third embodiment of a light source according to the invention.

FIG. 3 illustrates a schematic side view of a further embodiment of the light source according to the invention. In this embodiment, the light source comprises a filament 1 that is arranged in a bulb 2 and surrounds a depot 3 of carbon. The depot 3 is a carbon compact, and the filament 1 a tantalum carbide coating of the carbon compact.

During its light generating operation, the filament 1 and with it indirectly the depot 3 is heated via electric contacts 8 and 9. In this process, carbon evaporating from the filament 1 is replaced with carbon from the depot 3 by means of diffusion from the depot 3 toward the filament 1.

As regards further advantageous improvements and further developments of the teaching according to the invention, the general part of the description on the one hand and the attached claims on the other hand are herewith incorporated by reference for purposes of avoiding repetitions.

Finally, it should be very specially emphasized that the foregoing, merely arbitrarily selected embodiments are used only for explaining the teaching of the invention, without however limiting it to these embodiments.

The invention claimed is:

1. A light source comprising a heatable filament or an electrode, with the filament or the electrode being arranged in a bulb or a tube, and further comprising a depot which includes at least one chemical element, with the element being also present in the filament or the electrode, and with the depot arranged in the bulb or tube and in association with the filament or electrode such that the element can be supplied from the depot to the filament or the electrode.

2. The light source of claim 1, further comprising a gas atmosphere in the bulb or in the tube which contains an at least binary gas mixture comprising a lighter and a heavier gas or vapor.

3. The light source of claim 1, further comprising a gas or vapor in the bulb or tube which serves to transport the element to the filament or electrode.

4. The light source of claim 1, wherein the filament or electrode is configured to heat the depot and the element by radiation when the filament or electrode is heated.

5. The light source of claim 1, further comprising means for supplying the element to the filament or the electrode at a temperature of about 2000 degrees Celsius.

6. The light source of claim i, wherein the element in the depot is present in a solid or liquid form, or in a gaseous or vaporous state.

7. The light source of claim 1, wherein the element in the depot is present in a chemically combined or uncombined form with or without a carrier substance.

8. The light source of claim 1, wherein the depot comprises an organic substance that contains the element.

9. The light source of claim 1, wherein the depot comprises a carrier for the element.

10. The light source of claim 9, wherein the carrier comprises an organic substance that contains the element.

11. The light source of claim 9, wherein the carrier comprises an organic solvent that contains the element; and acetone, or formaldehyde, or acetic acid.

12. The light source of claim 9, wherein the carrier comprises rubber or a polymer.

13. The light source of claim 9, wherein the carrier is configured as a rubber O-ring or polymeric O-ring.

14. The light source of claim 9, wherein the carrier is porous.

15. The light source of claim 9, wherein the carrier comprises a ceramic.

16. The light source of claim 9, wherein the carrier comprises a polymer, or polymeric plastic, or foam metal, or sintered material.

17. The light source of claim 1, wherein the filament or electrode comprises tantalum carbide.

18. The light source claim 1, wherein the depot is arranged in a base portion of a bulb.

19. The light source of claim 1, further comprising a separate heating device for heating the depot and thus for the element.

20. The light source of claim 19, wherein the heating device operates by induction.

21. The light source of claim 19, wherein the heating device is an electric resistance heater.

22. The light source of claim 1 further comprising a heating device for the depot which is formed by components that connect between the filament or electrode and the depot in a heat conductive manner.

23. The light source of claim 1, wherein the spatial distance of the depot from the filament or the electrode is predetermined to control the temperature of the depot and with that the temperature of the element.

24. The light source of claim 1, wherein the one chemical element comprises carbon.

25. The light source of claim 1, wherein the depot is arranged in the filament or the electrode.

26. The light source of claim 1, wherein the depot is made integral with the filament or the electrode.

27. The light source of claim 1, wherein the depot comprises carbon.

28. The light source of claim 27, wherein the depot comprises a carbon compact, with the filament or the electrode being arranged on the carbon compact.

29. The light source of claim 1, wherein the light source comprises at least two filaments or electrodes, and further comprises means for operating or heating the two filaments or electrodes independently of each other.

30. The light source of claim 29, wherein the at least two filaments or electrodes are arranged in the same bulb or in the same tube.

31. The light source of claim 29, wherein the at least two filaments or electrodes are in a heat conductive contact.

32. The light source of claim 29, wherein the filaments are arranged in mutually looping relationship.

33. The light source of claim 1, further comprising a separate heating device for heating the filament or electrode.

34. The light source of claim 33, wherein the heating device is designed for generating an electrical ac voltage or a pulsed or timed electrical voltage for heating the filament or electrode.

35. The light source of claim 33, wherein the heating device operates inductively.

36. The light source of claim 1, further comprising means for cyclically heating the filament or the electrode to different temperatures.

37. The light source of claim 1, wherein the bulb or the tube is surrounded by a second bulb or a second tube.

38. The light source of claim 37, wherein the space between the first bulb and the second bulb or between the first tube and the second tube contains a vacuum or a very thin gas atmosphere with little heat conduction.

39. A method for regenerating a light source having a heatable filament or an electrode, with the filament or the electrode being arranged in a bulb or a tube, the method comprising the steps of:

positioning a depot in the bulb or tube and in association with the filament or the electrode, with the depot containing at least one element that is also present in the filament or the electrode; and supplying the element from the depot to the filament or to the electrode.

40. The method of claim 39, wherein the filament or the electrode is heated with an electrical ac voltage or a pulsed or timed electrical voltage by a resistance heating.

41. The method of claim 39, wherein the filament or electrode is heated by means of an inductively operating heating device.

42. The method of claim 39, wherein two or more filaments or electrodes are alternately operated in a light generating manner and that the element is simultaneously supplied to at least one filament or electrode not being operated in a light generating manner.

43. The method of claim 39, wherein the element is supplied onto or into the filament or the electrode.

44. The method of claim 39, wherein the element is supplied by means of a gas or vapor that contains the element.

45. The method of claim 39, wherein the element is supplied to the filament or the electrode under the influence of heat.

46. The method of claim 39, wherein the element is supplied to the filament or the electrode at a temperature of the filament or the electrode of about 2000 degrees Celsius.

47. The method of claim 39, wherein the supplying step occurs by diffusion, or thermal diffusion, or convection.

48. The method of claim 39, wherein the depot includes a carrier for the element, and wherein the carrier is immersed before its use into a liquid, organic substance that contains the element.

49. The method of claim 39, wherein the depot includes a carrier for the element, and wherein the carrier, is immersed before its use into an organic solvent that contains the element, and acetone, or formaldehyde, or acetic acid.

50. The method of claim 39, comprising the further steps of controlling the temperature of the depot and with that the temperature of the element by the spatial distance of the depot from the filament or the electrode.

51. The method of claim 39, comprising the further steps of controlling the temperature of the depot and with that the temperature of the element by a neck length of the bulb or the length of the tube in combination with the arrangement of the depot in the neck of the bulb or in the tube.

52. The method of claim 39, wherein the filament or the electrode is cyclically heated to different temperatures.

53. The method of claim 39, wherein the filament or the electrode heats another filament or another electrode via heat radiation and/or via a heat conductive contact.

* * * * *

UNITED STATES PATENT AND TRADEMARK OFFICE
CERTIFICATE OF CORRECTION

| | | |
|---|---|---|
| PATENT NO. | : 7,026,760 B2 | |
| APPLICATION NO. | : 10/933942 | |
| DATED | : April 11, 2006 | |
| INVENTOR(S) | : Arnold | |

It is certified that error appears in the above-identified patent and that said Letters Patent is hereby corrected as shown below:

Column 11,
Line 10, "claim i" should read --claim 1--.

Signed and Sealed this

Twenty-first Day of November, 2006

JON W. DUDAS
*Director of the United States Patent and Trademark Office*